United States Patent
Harris et al.

(10) Patent No.: US 7,539,214 B2
(45) Date of Patent: May 26, 2009

(54) VARIABLE RELIABILITY WIRELESS COMMUNICATION TRANSMISSION METHOD AND APPARATUS

(75) Inventors: John M. Harris, Chicago, IL (US); Vijay G. Subramanian, Chicago, IL (US); Fan Wang, Vernon Hills, IL (US); Jyoti Black, St. Charles, IL (US)

(73) Assignee: Motorola, Inc., Schaumburg, IL (US)

( * ) Notice: Subject to any disclaimer, the term of this patent is extended or adjusted under 35 U.S.C. 154(b) by 671 days.

(21) Appl. No.: 11/007,465

(22) Filed: Dec. 8, 2004

(65) Prior Publication Data

US 2006/0120298 A1    Jun. 8, 2006

(51) Int. Cl.
*H04J 3/24* (2006.01)
(52) U.S. Cl. ..................... 370/473; 370/471
(58) Field of Classification Search ............. 370/389, 370/349, 386, 395.5, 395.42, 473, 476, 474, 370/490, 493, 320, 321, 319, 314, 335, 337, 370/342, 344, 347, 471
See application file for complete search history.

(56) References Cited

U.S. PATENT DOCUMENTS

| | | | |
|---|---|---|---|
| 5,535,299 A * | 7/1996 | Riedel | 704/212 |
| 5,631,742 A * | 5/1997 | Shimoda | 386/52 |
| 5,646,947 A | 7/1997 | Cooper et al. | |
| 6,490,243 B1 * | 12/2002 | Tanaka et al. | 370/216 |
| 6,507,582 B1 * | 1/2003 | Abrol | 370/394 |
| 6,571,099 B1 | 5/2003 | Kim et al. | |
| 6,597,922 B1 | 7/2003 | Ling et al. | |
| 6,665,541 B1 | 12/2003 | Krasner et al. | |
| 6,728,203 B2 | 4/2004 | Wang | |
| 6,775,254 B1 * | 8/2004 | Willenegger et al. | 370/329 |
| 7,085,291 B2 * | 8/2006 | Zhang et al. | 370/473 |
| 7,142,542 B2 * | 11/2006 | Pazhyannur et al. | 370/394 |
| 7,415,477 B2 * | 8/2008 | Devadas et al. | 707/101 |
| 2002/0093948 A1 * | 7/2002 | Dertz et al. | 370/355 |
| 2002/0141370 A1 * | 10/2002 | Abrol et al. | 370/338 |

* cited by examiner

*Primary Examiner*—Brenda Pham

(57) ABSTRACT

A mobile station (150) senses (300) at least one boundary of a wireless communication packet (200) which includes a plurality of frames. The mobile station (150) then determines (310) at least a first group (210) and a second group (230) of frames at least in part in relation to the sensed boundary. The first group (210) of frames is received (320) at a first target reliability, and the second group (230) of frames is received (330) at a second target reliability. Optionally, the frames are sent (400) or received at a variable reliability in relation to the frames' distances from one or more boundaries (240, 250) of the packet (200).

7 Claims, 3 Drawing Sheets

_US 7,539,214 B2_

VARIABLE RELIABILITY WIRELESS COMMUNICATION TRANSMISSION METHOD AND APPARATUS

TECHNICAL FIELD

This invention relates generally to wireless communication systems and more particularly to systems that send data in wireless communication packets.

BACKGROUND

Wireless communication systems of various kinds are known in the art. Certain of these systems wirelessly send and receive digital data in the form of packets. Examples of such systems include General Packet Radio Service ("GPRS") related systems, certain Voice over Internet Protocol ("VoIP") systems, certain wireless Transmission Control Protocol/Internet Protocol ("TCP/IP") based systems, Code Division Multiple Access ("CDMA") 2000 systems, and other related systems. When data is transmitted in each of these systems, the data is divided into discrete packets, and each packet is further divided into a number of blocks or frames.

The frames can be sent and received using a variety of methods with varying aggressiveness and/or power efficiencies. Transmission methods with a higher aggressiveness are often preferred because more data is transmitted with the use of fewer control signals. By limiting the use of control signals, battery life can be extended or otherwise save power. Other transmission methods will vary the power of the transmissions to extend battery life or otherwise save power. Each of these transmission methods has a different target reliability of frame transmission or frame error rate.

During transmission, the receiver checks the received frames for errors. If an error is found within a frame or an expected frame is not received, the receiver will send an error message back to the transmitter such that the transmitter will retransmit that particular frame. If errors are received toward the end of a packet, however, the time to send an error message and then to receive the retransmitted or incremental redundant frame will delay the completion of the packet and thus extend the overall transmission time. Thus, the transmission methods with a higher aggressiveness or higher power efficiencies typically result in longer transmission times.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to various embodiments of the invention, a boundary of a wireless communication packet is sensed. Then, at least two groups of frames from the packet are determined relative to the boundary. Next, the two groups of frames are sent or received by a wireless communication device at different target reliabilities.

So configured, wireless communication devices can send and receive data packets at an increased efficiency with a decreased delay time. Groups of frames in a data packet closer to the leading boundary of the packet will be sent using transmission methods set to maximize resources such as power regardless of any corresponding increase in the frame error rate, whereas groups of frames in the data packet closer to the trailing boundary will be sent using transmission methods meant to minimize the frame error rate. By minimizing the frame error rate towards the end of the packet, the number of error messages and retransmissions of frames is minimized thereby shortening the delay time and overall transmission time for the packet. Therefore, the advantages of aggressive transmission methods can be realized for at least a portion of a transmission without causing excess delays or missed packets during the transmission.

Figure 1:
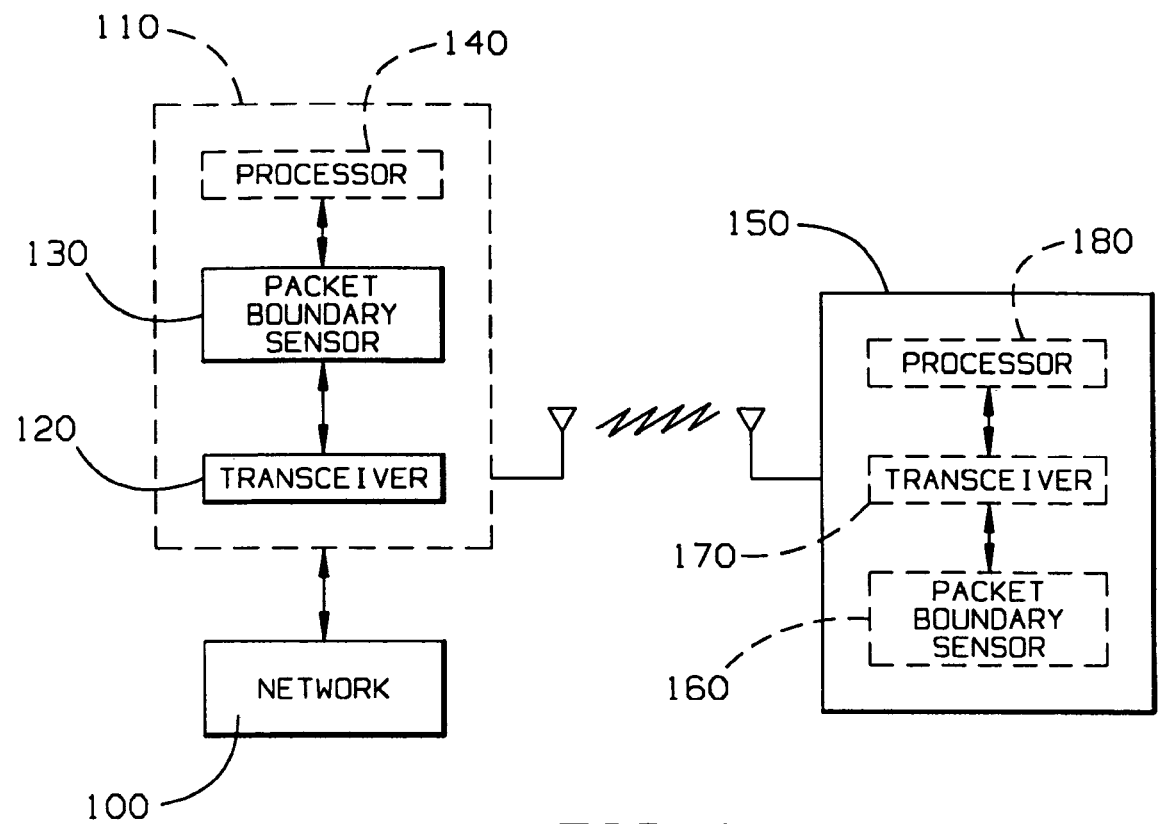
FIG. 1 comprises a block diagram as configured in accordance with various embodiments of the invention.

Referring now to the drawings, and in particular to FIG. 1, a network 100 is in communication with a wireless communication device 110 such that information can be exchanged between the network 100 and the wireless communication device 110. The wireless communication device 110 includes a transceiver 120 operably coupled to a packet boundary sensor 130 and, alternatively, a processor 140 operably coupled to the packet boundary sensor 130 and/or the transceiver 120. The transceiver 120 is capable of sending and receiving a plurality of frames within a packet at a variable reliability in relation to the frames' relative distances from a boundary of the packet. One skilled in the art will recognize that the processor 140, packet boundary sensor 130, and/or transceiver 120 may be separate structures or circuits or may be part of an integrated structure or circuit.

The wireless communication device 110 is in wireless communication with a mobile station 150. The mobile station 150 alternatively may include a packet boundary sensor 160. The mobile station 150 then, through the use of the packet boundary sensor 160, may also send and receive data packets at a variable reliability through a transceiver 170. The mobile station 150 alternatively may include a processor 180 for running software routines or otherwise controlling the operation of the mobile station 150.

One skilled in the art will recognize that the transmission methods described herein apply in either transmission direction between properly configured mobile stations 150 and wireless communication devices 110. In other words, in various embodiments mobile station 150 is operably the same as wireless communication device 110 and vice versa. As such, the mobile station 150 and wireless communication device 110 may be operably switched in the various embodiments discussed below.

Figure 2:
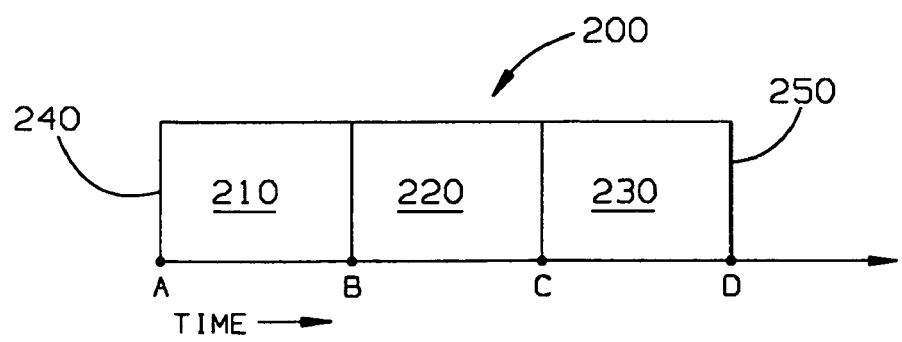
FIG. 2 comprises a representation of a data packet as used in certain data packet communication systems.

The transmission of data packets will be described generally with reference to FIG. 2. Wireless communication systems will divide data into packets 200 of varying width, depending on the system being used. A packet 200 is shown as divided into groups 210, 220, and 230 of frames. A packet's width, represented as the distance between the leading boundary 240 of the packet 200 at point A and the trailing boundary 250 at point D on the timeline of FIG. 2, is determined by the amount of time it takes to send or receive the data contained within the packet 200. The width of a packet 200 is typically about 1500 bytes of data or about 100 to 500 milliseconds of transmission time in an embodiment operating under a GPRS standard, and a packet 200 will include approximately 20 to 50 frames. Although the groups 210, 220, and 230 of frames are represented as approximately equal divisions of the packet 200, one skilled in the art will recognize that the groups 210, 220, and 230 may be of different sizes and that there may be any number of two or more groups 210, 220, and 230 of frames.

When a packet 200 is sent or received, a number of frames typically fail to be properly received. The rate at which frames fail to be received is typically referred to as a frame error rate. The more aggressive or power efficient transmission methods will typically have a higher frame error rate. When a wireless communication device sends an error message, a certain amount of time called the round trip time passes between sending an error message and receiving a retransmission of the missed frame. A round trip time can be up to 120 milliseconds for a GPRS related system.

For example, if an error occurs in the first group 210 of frames, the wireless communication device 110 has the time between point B and point D to send an error message and receive the retransmitted frame. If the round trip time is less than the time between point B and point D, the error will not result in a delay in the transmission of the packet 200. On the other hand, if an error occurs within group 220 and the round trip time is longer than the time between point C and point D, the error will result in a delay in the transmission of the packet 200. Similarly, if an error occurs within group 230, the round trip time will result in a transmission delay of the packet 200 equal to the amount of time that the round trip time extends beyond point D.

A method of operation of the mobile station 150 will now be described with reference to FIG. 3. During a wireless transmission, the packet boundary sensor 160 will sense 300 a boundary of a data packet 200 being received from a wireless communication device 110. The packet boundary sensor 160 will then determine 310 at least a first group and a second group of frames defined, at least in part, by a relationship to the sensed boundary. The mobile station 150 will then receive 320 the first group of frames at a first target reliability and receive 330 the second group of frames at a second target reliability.

The target reliability is set by using a particular wireless communication system and transmission method because each system and method will have an associated expected frame error rate. This frame error rate is a measurement of the reliability at which frames will be received at a wireless communication receiver such as at mobile station 150 or transceiver 120. By determining the groups of frames, the mobile station 150 and the wireless communication device 110 can quickly adjust the transmission and reception methods in order to adjust the reliability at which frames are sent and received thereby allowing proper transmission of the packets 200.

A packet boundary can be sensed 300 in a variety of ways. Preferably, the mobile station 150 will receive a signal indicating the leading or trailing boundary. The signal is sent by the transceiver 120 that sends the packet 200 and includes information such as a data amount or a time of signal sufficient for the mobile station 150 or processor 180 to determine one or more boundaries for the packet 200. Alternatively, the packet 200 sent by the transceiver 120 may include a data header received by the mobile station 150 that includes information regarding the boundary of the packet 200.

In another embodiment, the mobile station 150 can be adapted to determine a boundary based at least in part on the length of one or more previously received packets. In this case, the mobile station 150 includes one or more software routines or other enabling configurations that allow the mobile station 150 to estimate the boundary locations based on the amount of data from previous packets 200 or the amount of time needed to receive previous packets 200.

In yet another embodiment, the mobile station 150 can be adapted to determine a boundary based at least in part on the round trip time for an acknowledgement message. In this embodiment, the mobile station 150 includes one or more software routines or other enabling configurations that allow the mobile station 150 to track and determine the time it takes to send an acknowledgement message such as an error message and receive a response such as a retransmitted packet from the transceiver 120. Once the round trip time is known, the mobile station 150 may estimate a boundary associated with the round trip time such as the trailing boundary.

One of skill in the art will recognize that the methods used to sense a packet boundary can also be used to determine the groups of frames within a packet 200. In some embodiments, a group 230 of frames is determined by determining an acknowledgement type signal, such as an error message, approximate round trip time and then determining that the group 230 includes the frames within the approximate round trip time of the trailing boundary 250.

Alternatively, a first group 210 of frames may be determined by sensing an amount of data in an input buffer and determining that the input buffer holds a small amount of data. In this embodiment, a mobile station 150 will begin receiving data from a packet 200 and store the data in an input buffer or other memory. The mobile station 150 will sense the amount of data in the buffer and determine that the amount of data is small in comparison to an amount of data expected for the packet 200. The expected amount of data can be preprogrammed into the mobile station 150, or the packet 200 may contain a header to indicate the amount data to be received for the packet 200. In other words, the mobile station 150 knows that certain frames received into the buffer are close to a leading boundary because the mobile station 150 expects many more frames. Similarly, the mobile station 150 knows that certain frames received into the buffer are close to a trailing boundary because the mobile station 150 has received most of the expected frames. One skilled in the art can understand other ways to determine the amount of data to be received with a packet 200.

Figure 3:
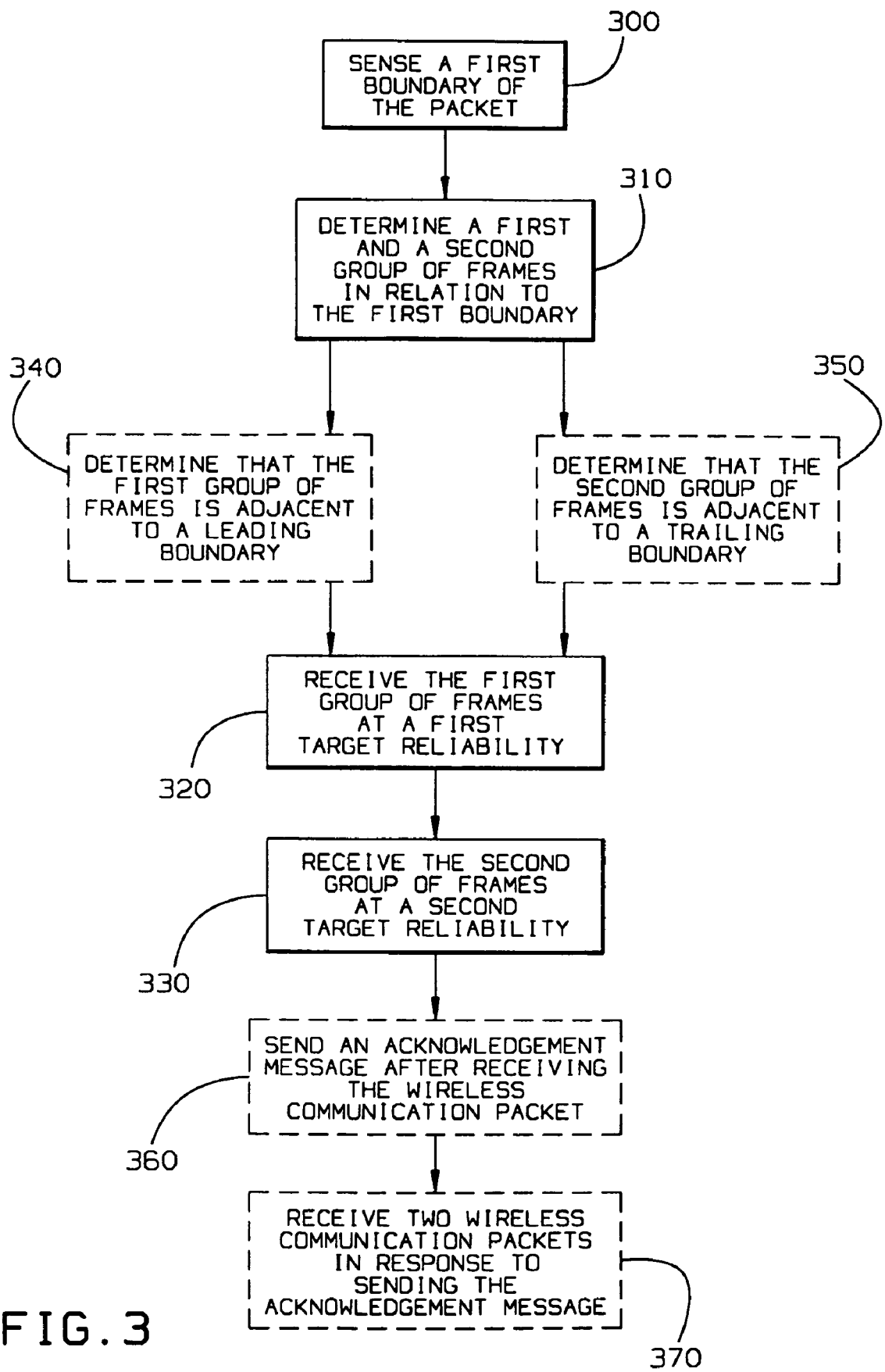
FIG. 3 comprises a flow diagram as configured in accordance with various embodiments of the invention from the point of view of receiving packets.

In one embodiment and in continuing reference to FIG. 3, the sensed boundary is a leading boundary 240 for the packet 200. Then, the packet boundary sensor 160 determines 340 that the first group 210 of frames is approximately adjacent to the leading boundary 240, and the group 210 of frames is received at a low reliability. Alternatively, the sensed boundary may be a trailing boundary 250 for the packet 200. In this embodiment, the packet boundary sensor 160 determines 350 that the second group 230 of frames is approximately adjacent to the trailing boundary 250, and the group 230 of frames is received at a high reliability.

Those skilled in the art will recognize that receiving the groups 210, 220, and 230 of frames at a high or low reliability can be done in a variety of ways. For example, if the mobile station 150 is receiving data under a radio link protocol, the mobile station 150 may receive the first group 210 of frames using a relatively long radio link protocol window because the longer window allows more data to be received before sending an error message or other control signals. By receiving more data as compared to the control signals, battery life for the mobile station 150 is conserved. Then, the mobile station 150 may receive the second group 230 of frames using a relatively short radio link protocol window. Using the shorter radio link protocol window allows the mobile station 150 to send error messages more often such that any retransmissions of frames can be received in the shortest amount of time possible after determining that a frame was not properly received.

In an alternative embodiment, a mobile station 150 using a wireless communication system utilizing an automatic repeat request ("ARQ") or hybrid automatic repeat request ("HARQ") system may receive the first group 210 of frames while sending a small number of acknowledgement type messages. By sending fewer acknowledgement messages, power for the mobile station 150 is conserved. Then, the mobile station 150 may receive the second group 230 of frames using a relatively larger number of acknowledgement type messages. Using the larger number of acknowledgement type messages allows the mobile station 150 to send error messages more often such that any retransmissions of frames can be received in the shortest amount of time possible after determining that a frame was not properly received.

In another alternative embodiment, a mobile station 150 using a wireless communication system utilizing a GPRS or Enhanced Data GSM ("Global System for Mobile communications") Environment ("EDGE") system may receive the first group 210 of frames using an aggressive coding scheme for coding the transmitted data. Under a GPRS/EDGE system, multiple coding schemes are available and are generally referred to by those skilled in the art as CS1, CS2, etc. An example of an aggressive coding scheme is CS3 or CS4 wherein the system utilizes less redundancy in sending data, thereby conserving power and transmission resources. A typical frame error rate for CS3 is around 12%. Then, the mobile station 150 may receive the second group 230 of frames using a relatively more redundant coding scheme such as CS1 or CS2. A typical frame error rate for CS1 is around 1% thereby substantially reducing the need for retransmission of frames after the receipt of the trailing boundary 250 of a packet 200.

In yet another alternative embodiment, a mobile station 150 may receive the first group 210 of frames as sent at a relatively low transmission power to conserve energy. This embodiment can apply in many wireless communication systems such as CDMA 2000, Universal Mobile Telecommunications System ("UMTS"), or High-Speed Downlink Packet Access ("HSDPA") systems. By reducing the transmission power, the reliability of receiving frames decreases. Then, the mobile station 150 may receive the second group 230 of frames as sent at a relatively high transmission power to increase the reliability of receiving the frames and thereby lessen the need for retransmissions of frames.

In still another embodiment, a mobile station 150 may receive the first group 210 of frames as sent at a relatively low target signal to interference ratio to conserve energy. Then, the mobile station 150 may receive the second group 230 of frames as sent at a relatively high target signal to interference ratio to increase the reliability of receiving the frames and thereby lessen the need for retransmissions of frames. One skilled in the art will recognize that any of the above embodiments may be utilized together to send or receive groups of frames at varying reliabilities.

Optionally, after receiving a packet 200, the mobile station 150 may send 360 an acknowledgement message to the transceiver 120. In response, the transceiver 120 will then send two wireless communication packets 200 to be received 370 by the mobile station 150. By sending more than one packet 200, the system will further conserve power and transmission resources. This embodiment is preferably employed after a packet 200 is received with a number of errors below a certain threshold or with errors that were corrected before a certain time in relation to the trailing boundary 250. A packet 200 received with no or few errors in such conditions indicates that conditions are good for continuous transmissions without waiting for acknowledgement type messages between every packet 200. Similarly, the mobile station 150 can send a signal to the transmitter to send frames or packets at an increased reliability where conditions are poor for the wireless communications.

One of skill in the art will recognize that more than two groups of frames may be determined and that the groups of frames may be sent or received with varying reliabilities depending on the groups' distances from a determined boundary. In an embodiment where coding schemes are used to vary reliability, a first group 210 of frames adjacent to the leading boundary 240 may be sent or received at CS4, a low reliability transmission method, and a second group 230 of frames adjacent to the trailing boundary 250 may be sent or received at CS1, a high reliability transmission method. Then, a third group 220 of frames located between the first 210 and third 230 groups of frames may be sent or received at CS2 or CS3, each of which has a reliability between that of CS4 and CS1. Similar uses of transmission methods with varying reliabilities can be used with more than two groups of frames.

Figure 4:
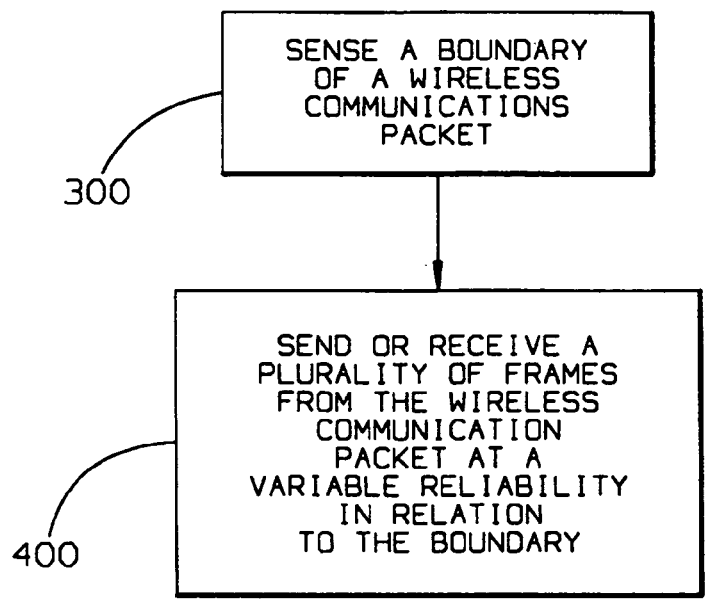
FIG. 4 comprises a flow diagram as configured in accordance with various embodiments of the invention that send or receive packets at variable reliability.

In an alternative embodiment described with reference to FIG. 4, a transceiver 120 operably coupled to a packet boundary sensor 130 senses 300 a boundary of a wireless communication packet 200. Then, the transceiver 120 sends 400 or receives a plurality of frames at a variable reliability relative to the frames' distances from the boundary of the wireless communication packet 200. In this embodiment, the reliability may be varied during the transmission of frames using any of the methods described above. Preferably, the trailing boundary 250 of the packet 200 is determined, and the frames are transmitted at an increasing reliability, using any of the above described transmission methods, as the transmission approaches the trailing boundary 250.

Figure 5:
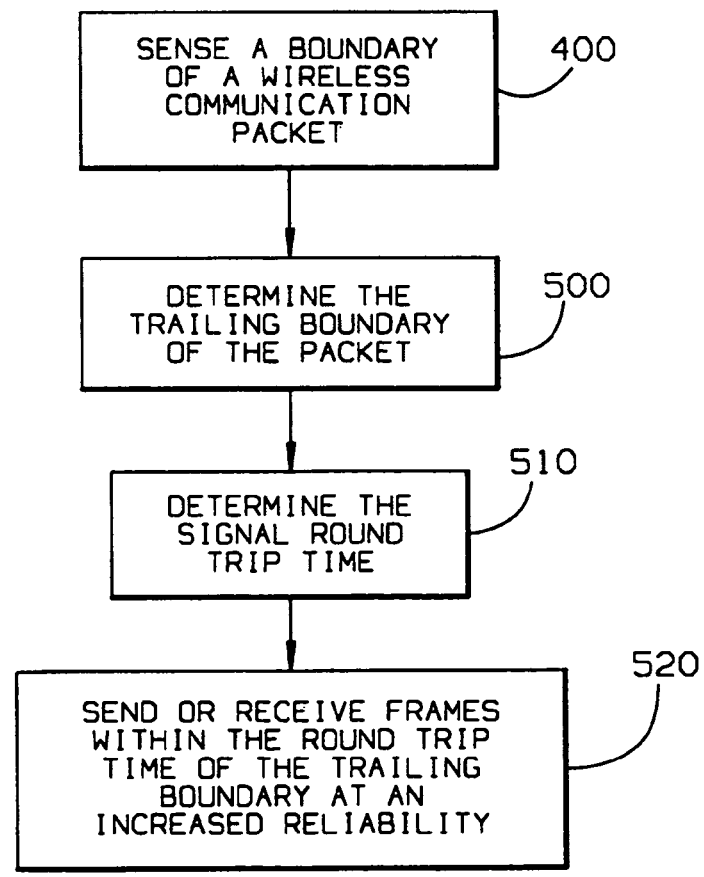
FIG. 5 comprises a flow diagram as configured in accordance with various embodiments of the invention that use a signal round trip time to determine the reliability of frames sent or received.

In a preferred embodiment described with reference to FIG. 5, after sensing 300 the boundary of a packet 200, the wireless communication device 110 determines 500 the trailing boundary 250 of the packet 200. Next, the wireless communication device 110 determines 510 the signal round trip time between it and the mobile station 150. Then the wireless communication device 110 sends 520 frames within the round trip time of the trailing boundary at an increasing reliability.

A wireless communication device 110 that sends a packet 200 can sense 300 a packet boundary in a variety of ways. Preferably, the wireless communication device 110 will send a signal indicating the leading or trailing boundary. The signal includes information such as a data amount or a time of signal sufficient for the wireless communication device 110 or processor 140 to determine one or more boundaries for the packet 200. Alternatively, the packet 200 may include a data header read by wireless communication device 110 that includes information regarding one or more boundaries of the packet 200.

In another embodiment, the wireless communication device 110 can be adapted to determine or sense 300 a boundary based at least in part on the length of one or more previously sent packets. In this case, the wireless communication device 110 includes one or more software routines or other enabling configurations that allow the wireless communication device 110 to estimate the boundary locations based on the amount of data from previous packets 200 or the amount of time needed to send previous packets 200.

In yet another embodiment, the wireless communication device 110 can be adapted to sense 300 a boundary based at least in part on the round trip time for an acknowledgement message. In this embodiment, the wireless communication device 110 includes one or more software routines or other enabling configurations that allow the wireless communication device 110 to track and determine the time it takes to receive an acknowledgement message such as an error message and send a response such as a retransmitted packet from the transceiver 120. Once the round trip time is known, the wireless communication device 110 may estimate a boundary, such as the trailing boundary, associated with the round trip time.

In still another embodiment, the wireless communication device 110 senses 300 an amount of data or available memory in a buffer and uses this information to calculate an approximate location of a boundary. In this embodiment, a wireless communication device 110 will receive data from a network 110 that will become the packet 200 sent to the mobile station 150. The wireless communication device 110 stores the data in a buffer or other memory prior to transmitting the packet 200. During transmission, the wireless communication device 110 will sense the amount of data in the buffer and determine the approximate location of the trailing boundary. One skilled in the art will recognize that a mobile station 150 that transmits packets 200 can also sense a boundary in this way.

So configured, wireless communication systems can obtain the benefit of using low reliability transmission methods without experiencing excessive transmission delays by varying the reliability of transmissions relative to one or more boundaries of a packet.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
    sensing at least a first boundary of a wireless communication packet comprising a plurality of frames wherein the first boundary is a trailing boundary;
    determining a first group of frames and a second group of frames at least in part in relation to the first boundary of the wireless communication packet and wherein the first group of frames and the second group of frames are a part of the wireless communication packet;
    determining that the second group of frames is approximate to the trailing boundary;
    receiving the first group of frames at a first target reliability; and
    receiving the second group of frames at a second target reliability wherein the second target reliability is a high reliability and comprises receiving frames in a short radio link protocol window, sending a large number of acknowledgement type messages, receiving frames using a more redundant data coding scheme, receiving frames sent at a high transmission power, receiving frames using a high target signal to interference ration, determining an approximate acknowledgement type signal round trip time and determining that the second group of frames is within the approximate acknowledgement type signal round trip time of the trailing boundary.

2. The method of claim 1 wherein the first boundary is a leading boundary.

3. The method of claim 2 further comprising:
    determining that the first group of frames is approximately adjacent to the leading boundary and wherein receiving the first group of frames at a first target reliability further comprises receiving the first group of frames at a low reliability.

4. The method of claim 3 wherein receiving the first group of frames at the first target reliability further comprises any one of:
    receiving frames in a long radio link protocol window;
    sending a small number of acknowledgement type messages;
    receiving frames using an aggressive data coding scheme;
    receiving frames sent at a low transmission power; and
    receiving frames using a low target signal to interference ratio.

5. The method of claim 3 wherein determining that the first group of frames is approximately adjacent to the leading boundary further comprises sensing an amount of data in an input buffer and determining that the input buffer holds a small amount of data.

6. The method of claim 1 wherein sensing at least a first boundary of the wireless communication packet further comprises any one of:
    receiving a signal indicating the first boundary of the packet;
    receiving a header in the packet indicating the first boundary of the packet;
    determining an approximate first boundary of the packet based at least in part on a length of at least one previously received packet; and
    determining an approximate first boundary of the packet based at least in part on an acknowledgement signal round trip time.

7. The method of claim 1 further comprising:
    sending an acknowledgement message after receiving the wireless communication packet comprising a plurality of frames;
    receiving at least two wireless communication packets in response to sending the acknowledgement message.

* * * * *